(12) United States Patent
Kubota

(10) Patent No.: US 7,301,575 B2
(45) Date of Patent: Nov. 27, 2007

(54) CAMERA AND CONTROL METHOD THEREFOR

(75) Inventor: Akira Kubota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 10/386,739

(22) Filed: Mar. 12, 2003

(65) Prior Publication Data

US 2003/0174229 A1    Sep. 18, 2003

(30) Foreign Application Priority Data

Mar. 15, 2002 (JP) .............................. 2002-072918

(51) Int. Cl.
*G02B 13/16* (2006.01)
*H04N 5/225* (2006.01)

(52) U.S. Cl. ...................... 348/335; 348/375

(58) Field of Classification Search ............... 348/335, 348/375

See application file for complete search history.

(56) References Cited

U.S. PATENT DOCUMENTS

| | | | |
|---|---|---|---|
| 6,111,608 A * | 8/2000 | Koizumi et al. | 348/342 |
| 6,643,458 B2 | 11/2003 | Sakamoto | |
| 2002/0008765 A1 * | 1/2002 | Ejima et al. | 348/239 |

FOREIGN PATENT DOCUMENTS

| | | |
|---|---|---|
| CN | 1420389 | 5/2003 |
| JP | 2001-069399 | 3/2001 |
| JP | 2001-326839 | 11/2001 |
| JP | 2002-131812 | 5/2002 |
| JP | 2003-149530 | 5/2003 |
| JP | 2003-270708 | 9/2003 |

OTHER PUBLICATIONS

Chinese Search Report and Office Action dated Jun. 24, 2005.
Chinese Official Action (4 Pages), dated Jun. 24, 2005.

* cited by examiner

*Primary Examiner*—Ngoc-Yen Vu
*Assistant Examiner*—A. Henderson
(74) *Attorney, Agent, or Firm*—Morgan & Finnegan LLP

(57) ABSTRACT

An object of this invention is to provide a camera which properly, effectively controls lens collapsing operation and is excellent in usability and the like, and a control method therefor. To achieve this object, the camera includes a power source which supplies power for camera operation, a collapsible lens for performing photographing, and a controller which controls the extension and storage operations of the collapsible lens. The collapsible lens is driven and controlled in accordance with a camera operation mode. The camera has a designation function of designating a collapsing control method for the collapsible lens. The controller drives and controls the collapsible lens in accordance with a collapsing control method designated by the designation function. The collapsing control method includes an auto mode and an always lens extension mode. When the power source is turned off in the always lens extension mode, storage operation of the collapsible lens is inhibited.

3 Claims, 5 Drawing Sheets

CAMERA AND CONTROL METHOD THEREFOR

FIELD OF THE INVENTION

The present invention relates to a camera which senses and records an image, and more particularly, to a camera having a collapsible lens which constitutes an optical system, and a control method therefor.

BACKGROUND OF THE INVENTION

Some cameras which adopt a collapsible lens automatically perform lens extension operation synchronized with power-on of the camera or lens storage operation synchronized with power-off of the camera. Some digital cameras capable of reproducing a sensed image in the camera main body automatically perform lens extension operation synchronized with a photographing mode or lens storage operation synchronized with a reproduction mode.

Automatic lens extension and storage by a camera provide a merit of saving the user's labor. However, the lens is extended/stored every time the camera is powered on/off or switched between the photographing mode and the reproduction mode. The user must wait for the completion of such operation for the time taken for the operation.

Cameras having a conversion lens and marine pack mounted outside the camera similarly execute lens extension and storage though the lens need not be stored. Lens extension and storage operations consume power necessary to drive the lens, wasting the battery.

SUMMARY OF THE INVENTION

The present invention has been made in consideration of the above situation, and has as its object to provide a camera which properly, effectively controls lens collapsing operation and is excellent in usability and the like, and a control method therefor.

To solve the above-described problem and achieve the above object, according to the first aspect of the present invention, an apparatus comprises (A) a switching device which switches a state of the apparatus; and (B) a control device which drives and controls a photographing optical system between a move-out state and a move-in state in response to switching of the switching device, wherein the control device can select different driving control modes with respect to the same switching by the switching device.

According to the second aspect of the present invention, an apparatus comprises (A) a switching device which switches a state of the apparatus, and (B) a control device which drives and controls a photographing optical system between an extension state and a storage state in response to switching of the switching device, wherein the control device can select different driving control modes with respect to the same switching by the switching device.

According to the third aspect of the present invention, a method of driving and controlling a photographing optical system comprises: driving and controlling the photographing optical system between a move-out state and a move-in state in response to state switching of an apparatus on which the photographing optical system is mounted, and enabling selecting different driving control modes with respect to the same state switching of the apparatus.

According to the fourth aspect of the present invention, a method of driving and controlling a photographing optical system comprises: driving and controlling the photographing optical system between an extension state and a storage state in response to state switching of an apparatus on which the photographing optical system is mounted, and enabling selecting different driving control modes with respect to the same state switching of the apparatus.

According to the fifth aspect of the present invention, a computer program of driving and controlling a photographing optical system comprises: driving and controlling the photographing optical system between a move-out state and a move-in state in response to state switching of an apparatus on which the photographing optical system is mounted, and enabling selecting different driving control modes with respect to the same state switching of the apparatus.

According to the sixth aspect of the present invention, a storage medium stores the driving control computer program.

According to the seventh aspect of the present invention, a computer program of driving and controlling a photographing optical system comprises: driving and controlling the photographing optical system between an extension state and a storage state in response to state switching of an apparatus on which the photographing optical system is mounted, and enabling selecting different driving control modes with respect to the same state switching of the apparatus.

According to the eighth aspect of the present invention, a storage medium stores the driving control computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1C is a view when the camera is viewed from the finder;

DETAILED DESCRIPTION OF THE PREFERRED EMBODIMENT

A camera and control method therefor according to a preferred embodiment of the present invention will be described below with reference to the accompanying drawings.

Figure 1A:
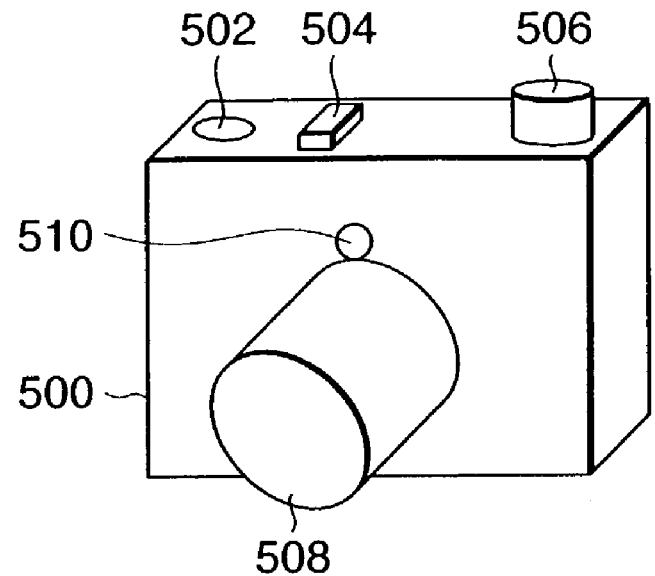
FIG. 1A is a view showing a lens extension state when a camera according to an embodiment of the present invention is viewed from the lens.
Figure 1B:
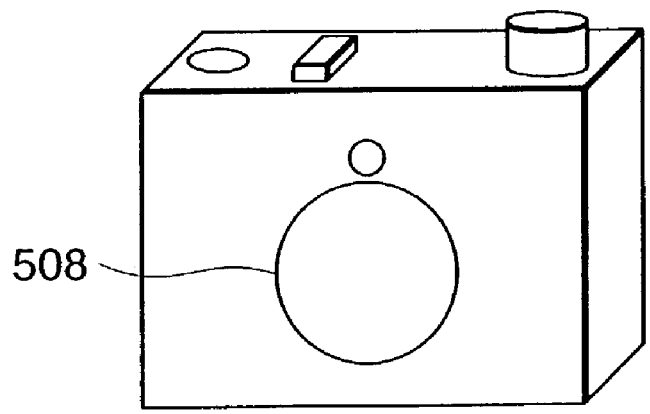
FIG. 1B is a view showing a lens storage state when the camera is viewed from the lens.
Figure 2A:
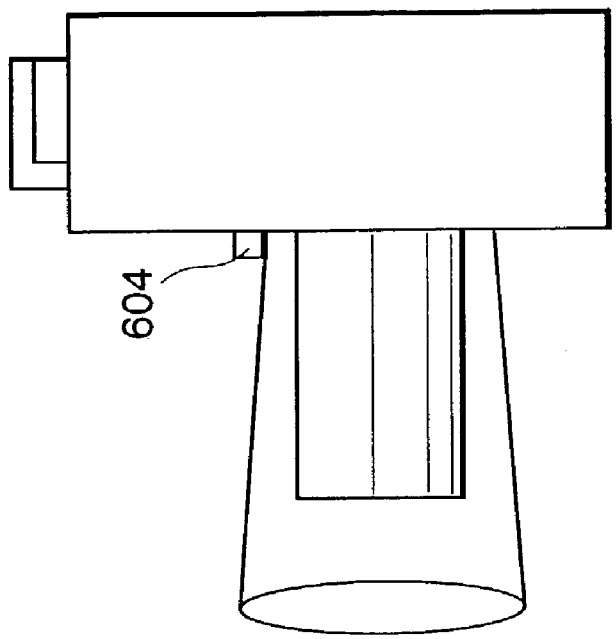
FIG. 2A is a view before a conversion lens is mounted when the lens-extended camera according to the embodiment of the present invention is viewed from the side.
Figure 2B:
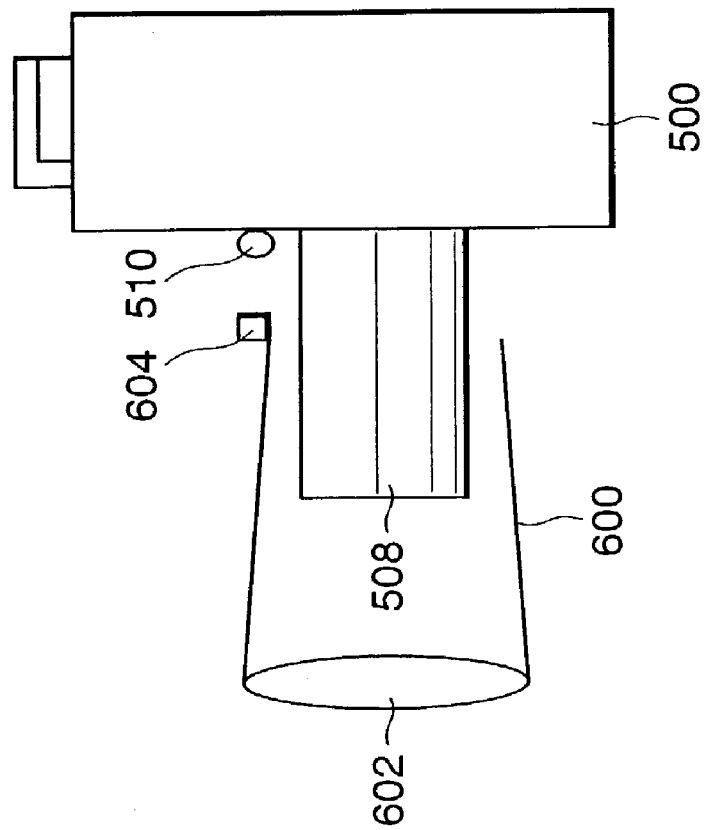
FIG. 2B is a view after the conversion lens is mounted when the lens-extended camera is viewed from the side.

FIGS. 1A to 1C, 2A, and 2B are views showing the outer appearance of a camera according to the embodiment of the present invention. FIG. 1A shows a state wherein a collapsible lens is extended. FIG. 1B shows a state wherein the collapsible lens is stored. FIG. 1C is a state wherein the camera is viewed from the, finder side. FIG. 2A shows a state wherein an adaptor such as a conversion lens is to be mounted on the camera main body while the collapsible lens is extended. FIG. 2B shows a state wherein the conversion lens is mounted on the camera main body.

In FIG. 1, reference numeral 500 denotes a camera main body. The camera main body 500 comprises a shutter button 502, power ON/OFF switch 504, mode dial switch 506, adaptor detection switch 510, collapsible lens 508, display device 520, and menu selection key 521.

Reference numeral 600 denotes a conversion lens. The conversion lens 600 comprises a lens 602, and a push pin 604 against the adaptor detection switch 510 of the system controller 50. When the conversion lens 600 is mounted, the push pin 604 pushes the adaptor detection switch 510.

As is apparent from FIG. 2B, when the conversion lens 600 is mounted, it completely covers the collapsible lens 508 of the camera. The mounted conversion lens 600 stores the collapsible lens 508, and the camera loses its compactness. That is, storage of the collapsible lens 508 and the compactness of the camera are irrelevant to each other.

Figure 3:
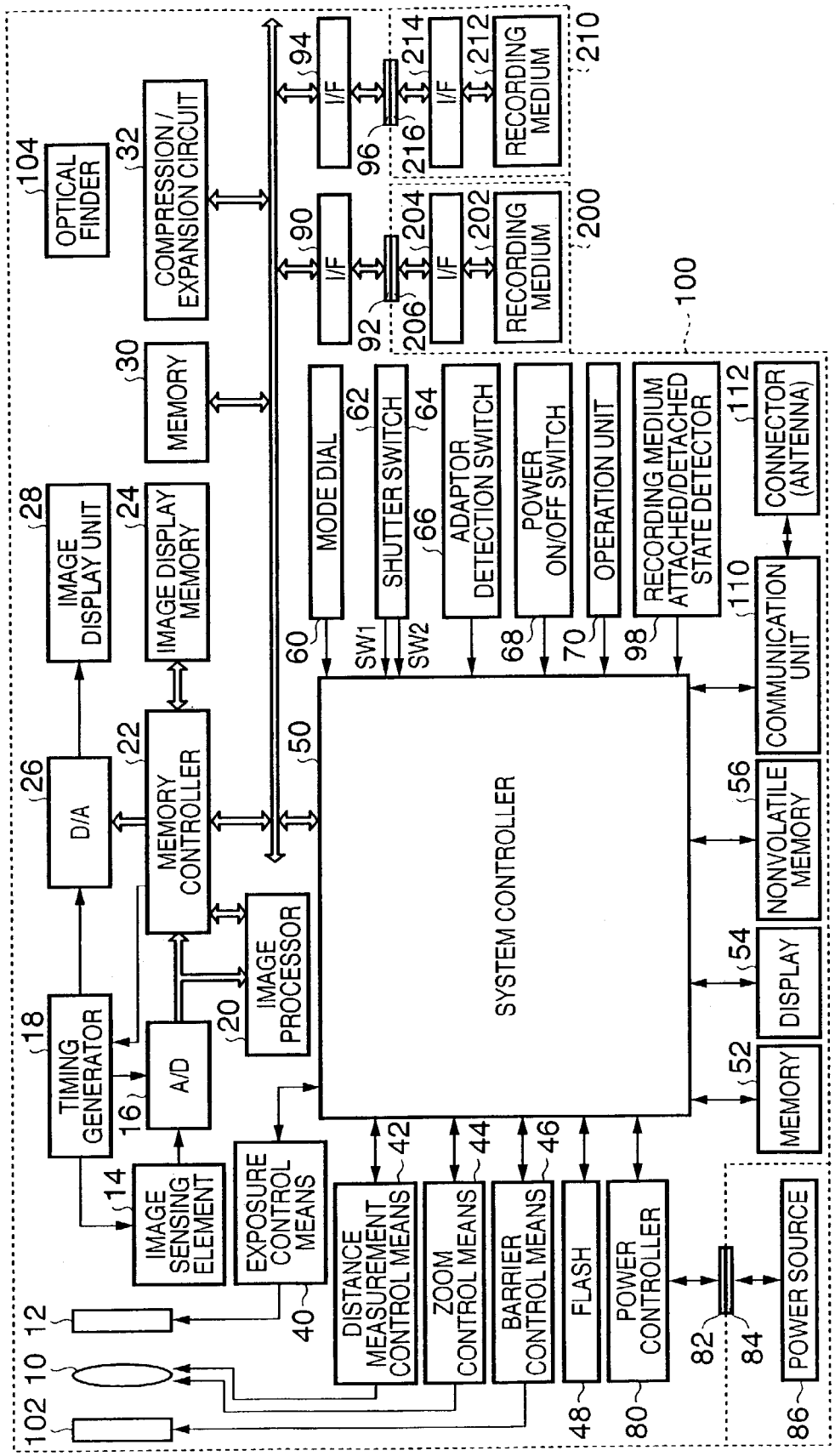
FIG. 3 is a block diagram showing an arrangement according to the embodiment of the present invention.

FIG. 3 is a block diagram showing the internal block arrangement of a digital camera system according to the embodiment of the present invention.

In FIG. 3, reference numeral 100 denotes an image processing apparatus; 10, a photographing lens; 12, a shutter having a stop function; 14, an image sensing element which converts an optical image into an electrical signal; 16, an A/D converter which converts an analog signal output from the image sensing element 14 into a digital signal; and 18, a timing generator which supplies a clock signal and control signal to the image sensing element 14, the A/D converter 16, and a D/A converter 26 under the control of a memory controller 22 and system controller 50.

Reference numeral 20 denotes an image processor which performs predetermined pixel interpolation processing and color conversion processing on data from the A/D converter 16 or data from the memory controller 22. The image processor 20 also performs predetermined calculation processing using sensed image data. The system controller 50 performs TTL (Through-The-Lens) AF (Auto Focus) processing, AE (Auto Exposure) processing, and EF (pre-flash) processing with respect to an exposure control means 40 and distance measurement control means 42 on the basis of the obtained calculation result. Further, the image processor 20 performs predetermined calculation processing using sensed image data, and performs TTL AWB (Auto White Balance) processing on the basis of the calculation result.

The memory controller 22 controls the A/D converter 16, the timing generator 18, the image processor 20, an image display memory 24, the D/A converter 26, a memory 30, and a compression/expansion circuit 32. Data from the A/D converter 16 is written into the image display memory 24 or memory 30 via the image processor 20 and memory controller 22, or directly via the memory controller 22. Reference numeral 24 denotes the image display memory; 26, the D/A converter; and 28, an image display unit comprised of a TFT LCD or the like. Display image data written in the image display memory 24 is displayed on the image display unit 28 via the D/A converter 26. An electronic finder function can be realized by sequentially displaying sensed image data on the image display unit 28. The image display unit 28 arbitrarily turns on/off its display in accordance with an instruction from the system controller 50. If the display is turned off, the electric consumption of the image processing apparatus 100 can be greatly reduced.

The memory 30, used for storing photographed still and moving images, has a sufficient storage capacity for storing a predetermined number of still images and a moving image for a predetermined period. In sequential shooting to sequentially shoot a plurality of still images or in panoramic photographing, a large number of images can be written into the memory 30 at a high speed. The memory 30 can be used as a work area for the system controller 50.

The compression/expansion circuit 32 compresses or expands image data by adaptive discrete cosine transformation (ADCT) or the like. The compression/expansion circuit 32 reads out an image stored in the memory 30, performs compression or expansion processing on the read image, and writes the processed data into the memory 30.

The exposure control means 40 controls the shutter 12 having a stop function, and also has a flash dimming function in cooperation with a flash 48. The distance measurement control means 42 controls focusing of the photographing lens 10. Reference numeral 44 denotes a zoom control means which controls zooming of the photographing lens 10; and 46, a barrier control means which controls the operation of a protection means 102 serving as a barrier for the photographing lens 10. The flash 48 has an AF auxiliary light projection function and flash adjusting function. The exposure control means 40 and distance measurement control means 42 are controlled by the TTL method. The system controller 50 controls the exposure control means 40 and distance measurement control means 42 on the basis of the calculation result of calculating sensed image data by the image processor 20.

The system controller 50 controls the overall image processing apparatus 100. Reference numeral 52 denotes a memory which stores constants, variables, programs, and the like for operating the system controller 50. Reference numeral 54 denotes a display unit including a liquid crystal display device and loudspeaker which display and output operating statuses, messages, and the like by using characters, images, sound, and the like in accordance with execution of a program by the system controller 50. One or a plurality of display units 54 are arranged at easy-to-see positions near the operation unit of the image processing apparatus 100. Each display unit 54 includes a combination of an LCD, LED, sound generating element, and the like. Some functions of the display unit 54 are provided within an optical finder 104.

The display contents of the display unit 54, displayed on the LCD or the like, include indication of single-shot/ sequential shooting, a self timer, a compression ratio, the number of recording pixels, the number of recorded images, the number of recordable images, a shutter speed, an f-number, exposure compensation, flash illumination, pink-eye effect mitigation, macro photographing, a buzzer-set state, a remaining timer battery level, a remaining battery level, an error state, information of plural digit numbers, the attached/ detached status of recording media 200 and 210, the operation of a communication I/F, and date and time. The display contents of the display unit 54, displayed within the optical finder 104, include a focus state, a camera shake warning, a flash charge state, a shutter speed, an f-number, and exposure compensation.

Reference numeral 56 denotes an electrically erasable and recordable nonvolatile memory which is typically an EEPROM.

Reference numerals 60, 62, 64, 66, 68, and 70 denote operation means used to input various operation instructions to the system controller 50. These operation means 60, 62, 64, 66, 68, and 70 comprise one or a plurality of combinations of switches, dials, touch panels, and the like. These operation means will be described in detail. The mode dial switch 60 corresponds to the mode dial switch 506 shown in FIG. 1A. The mode dial switch 60 allows switching and setting function modes such as an automatic photographing mode, a photographing mode, a panoramic photographing mode, a reproduction mode, a multi-image reproduction/erase button, and PC connection mode.

The power switch 68 corresponds to the power ON/OFF switch 504 shown in FIG. 1A, and allows switching the power-on/off state of the camera.

The shutter switch SW1 62 corresponds to the shutter button 502 shown in FIG. 1A. The shutter switch SW1 62 is turned on by half stroke of the shutter button (not shown) to designate the start of the operations of AF (Auto Focus) processing, AE (Auto Exposure) processing, AWB (Auto White Balance) processing, and EF (pre-flash) processing.

The shutter switch SW2 64 is turned on by full stroke of the shutter button (not shown) to designate the start of a series of processing operations including exposure processing to write a signal read from the image sensing element 14 into the memory 30 via the A/D converter 16 and memory controller 22, development processing by using calculations by the image processor 20 and memory controller 22, and recording processing to read out image data from the memory 30, compress the image data by the compression/expansion circuit 32, and write the image data into the recording medium 200 or 210.

The adaptor detection switch 66 corresponds to the adaptor detection switch 510 shown in FIG. 1A, and detects attachment of the conversion lens 600 or the like. The detection result of the adaptor detection switch 66 is used to control lens collapsing operation by the system controller 50. When the adaptor detection switch 66 detects that the conversion lens 600 is mounted, the system controller 50 determines not to store the lens.

The operation unit 70 comprises various buttons and touch panels corresponding to the display device 520 and menu selection key 521 shown in FIG. 1C. The operation unit 70 includes a menu button, a set button, a macro button, a multi-image reproduction/repaging button, a flash set button, a single-shot/sequential shooting/self-timer switching button, a forward (+) menu item selection button, a backward (−) menu item selection button, a forward (+) reproduction image search button, a backward (−) reproduction image search button, a photographing quality selection button, an exposure correction button, and a date/time set button.

The operation unit 70 has a designation function of designating a lens collapsing control method. The collapsible lens can be driven and controlled in accordance with a collapsing control method designated by the designation function. The collapsing control method includes "auto mode" and "always lens extension mode". In the auto mode, lens extension and collapsing operations are automatically executed in synchronism with the mode dial switch 60, power switch 68, and adaptor detection switch 66. When the power switch 68 is turned off and the conversion lens 600 is mounted, it is automatically determined not to store the lens.

Reference numeral 80 denotes a power control means which comprises a battery detection circuit, a DC/DC converter, a switch circuit to switch a block to be energized, and the like. The power control means 80 detects the attached/detached state of the battery, a battery type, and a remaining battery power level. The power control means 80 controls the DC/DC converter based on detection results and an instruction from the system controller 50, and supplies a necessary voltage to respective parts including a recording medium for a necessary period. Reference numerals 82 and 84 denote connectors; and 86, a power source means including a primary battery such as an alkaline battery or lithium battery, a secondary battery such as an NiCd battery, NiMH battery, or Li battery, an AC adaptor, and the like.

Reference numerals 90 and 94 denote interfaces for recording media such as a memory card and hard disk; 92 and 96, connectors which connect the image processing apparatus 100 and recording media such as a memory card and hard disk; and 98, a recording medium attached/detached state detection means which detects whether the recording medium 200 or 210 is attached to the connector 92 or 96.

In this embodiment, two systems of interfaces and connectors for connection with the recording medium are employed. However, one or a plurality of systems of interfaces and connectors for connection with recording medium may be provided. Further, interfaces and connectors pursuant to different standards may be combined. As the interfaces and connectors, cards in conformity with PCMCIA card standards and cards in conformity with CF (Compact Flash®) card standards may be used. In a case where cards and connectors in conformity with the PCMCIA standards, CF (Compact Flash®) card standards, and the like are used as the interfaces 90 and 94 and the connectors 92 and 96, image data and management information attached to the image data can be transferred between the image processing apparatus and other peripheral devices such as a computer and printer by connecting various communication cards such as a LAN card, modem card, USB card, IEEE 1394 card, P1284 card, SCSI card, and PHS card.

The protection means 102 is a barrier which prevents contamination and damage of an image sensing portion by covering the image sensing portion including the lens 10 of the image processing apparatus 100. The optical finder 104 allows photographing an image by using only the optical finder without using any electronic finder function on the image display unit 28. The optical finder 104 displays some functions of the display unit 54 such as a focus state, a camera shake warning, a flash charge state, a shutter speed, an f-number, and exposure compensation.

Reference numeral 110 denotes a communication means having various communication functions for RS232C, USB, IEEE 1394, P1284, SCSI, modem, LAN, and wireless communication; and 112, a connector/antenna which functions as a connector when the image processing apparatus 100 is connected to another device via the communication means 110, and as an antenna for wireless communication.

The recording medium 200 comprises a memory card, hard disk, or the like. The recording medium 200 has a recording unit 202 of a semiconductor memory, magnetic disk, or the like, an interface 204 for the image processing apparatus 100, and a connector 206 for connection with the image processing apparatus 100. Also, the recording medium 210 comprises a memory card, hard disk, or the like. The recording medium 210 has a recording unit 212 of a semiconductor memory, magnetic disk, or the like, an interface 214 for the image processing apparatus 100, and a connector 216 for connection with the image processing apparatus 100.

Operation in this embodiment will be explained with reference to FIGS. 4 and 5.

Figure 4:
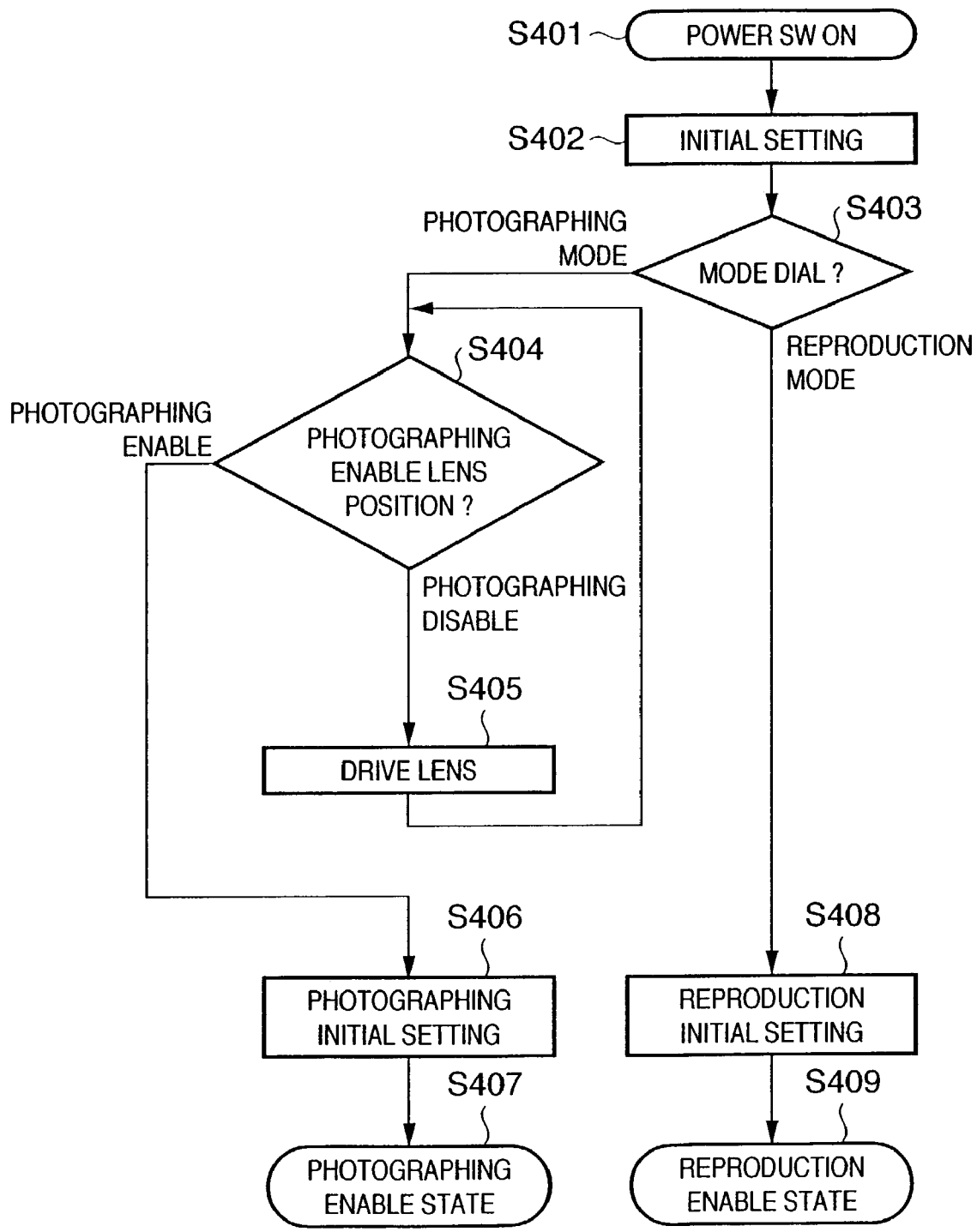
FIG. 4 is a flow chart showing power-on operation according to the embodiment of the present invention.

FIG. 4 is an activation flow chart after the power switch of the camera is turned on. The power switch 68 is turned on, and the power switch ON flow starts (step S401). Hardware and software necessary for the camera system are initialized (step S402). Which mode is used to activate the camera is determined by checking the state of the mode dial 60 (step S403).

In this case, which of the photographing and reproduction modes is set is determined, and corresponding processing is executed. To activate the camera in the photographing mode, the lens must be extended for photographing. Thus, whether the lens position is a photographing enable position is checked (step S404). If the lens position is determined as a photographing disable position, the lens is driven to the photographing enable position (step S405). After lens driving, the lens position is checked again, and the lens is repetitively driven until it reaches a photographing enable lens position. If the lens reaches a photographing enable lens position, hardware and software necessary for photographing are initialized (step S406), and the camera changes to a photographing enable state.

Figure 5:
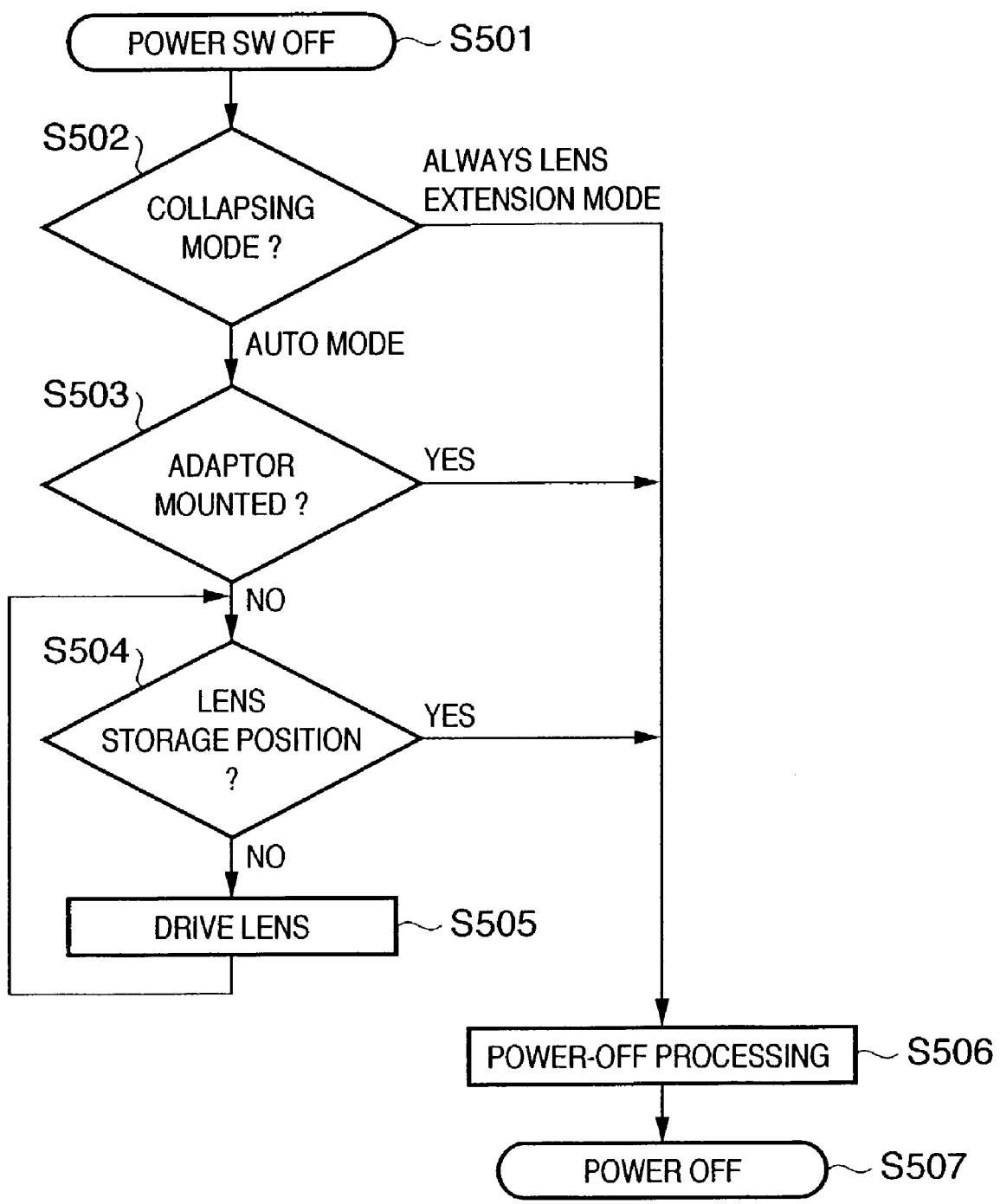
FIG. 5 is a flow chart showing power-off operation according to the embodiment of the present invention.

FIG. 5 is a shut-down flow chart after the power switch of the camera is turned off.

The power switch 68 is turned off, and the power switch OFF flow starts (step S501). A collapsing control method designated by the operation unit 70 is checked, and corresponding processing is executed depending on which of the auto mode and always lens extension mode is set. If the camera is set in the always lens extension mode, the lens need not be stored, camera system power-off processing is performed (step S506), and the camera is powered off (step S507).

If the camera is set in the auto mode, whether the conversion lens 600 or the like is mounted on the camera is checked by the adaptor detection switch 66 (step S503) If mounting of the conversion lens 600 or the like is detected, the lens need not be stored, camera system power-off processing is performed (step S506), and the camera is powered off (step S507).

If no conversion lens or the like is mounted, lens storage processing is done. The lens position is checked, and whether the lens is at a storage position is determined (step S504). If the lens is not at the storage position, the lens is driven toward the storage position (step S505). Lens position check and lens driving are repeated until the lens reaches the storage position. If it is confirmed that the lens has moved to the storage position, camera system power-off processing is performed (step S506), and the camera is powered off (step S507).

In this fashion, when the always lens extension mode is selected by the operation unit 70, or the conversion lens 600 or the like is mounted, no lens storage operation is executed in power-off processing. This greatly shortens the time until the camera is actually powered off after the power switch is turned off. In the next power-on processing, the lens has already been extended at the photographing enable position. This greatly shortens the time until the camera becomes a photographing enable state after the power switch is turned on. At the same time, no lens collapsing operation is performed upon power-on/off, reducing power consumption.

In the above embodiment, the conversion lens 600 is mounted on the camera, as shown in FIGS. 2A and 2B. The present invention is not limited to the conversion lens, and can be applied to a case where a marine pack is mounted in the use of the camera under water. The same effects as those in mounting the conversion lens can be obtained as long as the mounted marine pack pushes the adaptor detection switch 510 in FIG. 2A.

In the above embodiment, whether to store the lens can be selected upon switching the power source from ON to OFF. The present invention is not limited to this, and can be applied to a case where whether to extend the lens can be selected upon switching the power source from OFF to ON, whether to store the lens can be selected upon switching not the power source but another camera state from, e.g., the photographing mode to the reproduction mode, or whether to extend the lens can be selected upon switching the camera state from the reproduction mode to the photographing mode.

The embodiment has exemplified particularly a digital camera. The present invention can also be effectively applied to a silver halide camera, and the same effects as those of the above embodiment can be obtained.

Function blocks and processing sequences described in the embodiment may be realized by hardware or by a microcomputer system including a CPU or MPU, ROM, RAM, and the like while realizing the operation in accordance with a work program stored in the ROM or RAM. The present invention is also achieved when a software program for realizing a function is supplied to the RAM so as to realize the function of each function block and the function block operates in accordance with the program.

In this case, the software program realizes the functions of the above-described embodiment. The program, and a means for supplying the program to a computer, e.g., a storage medium which stores the program constitute the present invention. The storage medium which stores the program includes a flexible disk, hard disk, optical disk, magneto-optical disk, CD-ROM, CD-I, CD-R, CD-RW, DVD, zip, magnetic tape, and nonvolatile memory card, in addition to a ROM and RAM.

The functions of the above-described embodiment are realized when the computer executes the supplied program. Also, the functions of the above-described embodiment are realized when the program is executed in cooperation with an OS (Operating System) or another application software running on the computer.

The functions of the above-described embodiment are also realized when the supplied program is stored in the memory of the function expansion board of the computer or the memory of a function expansion unit connected to the computer, and the CPU of the function expansion board or function expansion unit performs part or all of actual processing on the basis of the instructions of the program.

As has been described above, in the present invention, the user can select not to perform collapsible lens storage operation upon power-off. The activation time is shortened in the next power-on, realizing high-speed camera activation. The user hardly misses a good photographing opportunity. The absence of collapsible lens driving reduces power consumption, the battery duration is prolonged, and the camera can take many pictures for a long time.

As many apparently widely different embodiments of the present invention can be made without departing from the spirit and scope thereof, it is to be understood that the invention is not limited to the specific embodiments thereof except as defined in the appended claims.

What is claimed is:

1. An apparatus comprising:
   (A) a switching device which switches from ON state of the apparatus to OFF state of the apparatus;
   (B) a control device which drives and controls a photographing optical system between a move-out state and move-in state in response to switching of said switching device;
   (C) a designating device which designates one of a first method and a second method as a method of driving control of the photographing optical system for moving-out and moving-in; and (D) detection device which detects whether or not an adaptor is coupled to the apparatus, wherein said control device performs driving control of the photographing optical system based on whether or not the adaptor is coupled to the apparatus, when the first method is designated by said designating device and performs driving control of the photographing optical system regardless of whether or not the adaptor is coupled to the apparatus, when the second method is designated by said designating device.

2. The apparatus according to claim 1, wherein said control device can select whether to drive the photographing optical system from the move-in state to the move-out state in response to switching of the power source of the apparatus from the OFF state to the ON state by said switching device.

3. An apparatus comprising:

(A) a switching device which switches the apparatus from a photographing mode to a reproduction mode;

(B) a driving device which drives a photographing optical system to move-out or move-in;

(C) a control device which can select different driving controls of the photographing optical system when mode is changed from the photographing mode to the reproduction mode; and (D) a detection device which detects whether or not an adaptor is coupled to the apparatus, wherein said control device can select whether to drive the photographing optical system from the move-out state to the move-in state in response to switching from the photographing mode to the reproduction mode by said switching device depending on whether an adaptor is mounted.

* * * * *